United States Patent
Bheda et al.

[11] Patent Number: 5,781,664
[45] Date of Patent: Jul. 14, 1998

[54] HIGHLY EFFICIENT METHOD AND STRUCTURE FOR MOTION COMPENSATION IN A VIDEO DECOMPRESSION SYSTEM

[75] Inventors: Hemant Bheda, Cupertino; Partha Srinivasan, Fremont, both of Calif.

[73] Assignee: National Semiconductor Corporation, Santa Clara, Calif.

[21] Appl. No.: 949,019

[22] Filed: Oct. 10, 1997

Related U.S. Application Data

[63] Continuation of Ser. No. 526,533, Sep. 11, 1995, abandoned.

[51] Int. Cl.⁶ .................................................. G06K 9/36
[52] U.S. Cl. ...................... 382/233; 382/236; 364/724.05
[58] Field of Search ................................ 382/236, 233, 382/232, 260, 272, 254; 358/447, 448; 364/724.05, 724.011

[56] References Cited

U.S. PATENT DOCUMENTS

| | | | |
|---|---|---|---|
| 5,471,577 | 11/1995 | Lightbody et al. | 348/552 |
| 5,579,052 | 11/1996 | Artieri | 348/416 |
| 5,606,677 | 2/1997 | Balmer et al. | 395/384 |
| 5,638,310 | 6/1997 | Artieri | 364/724.05 |
| 5,717,899 | 2/1998 | Artieri | 394/477 |

OTHER PUBLICATIONS

Mano, Digital Logic and Computer Design. 1979, pp. 329-330 & 335-336.

*Primary Examiner*—Yon J. Couso
*Attorney, Agent, or Firm*—Steven F. Caserza; Flehr Hohbach Test Albritton & Herbert

[57] ABSTRACT

A novel method and structure for the implementation of Half Pixel Filtering and Block Averaging that are efficient for implementation on a general purpose CPU. The number of required operations are reduced by operating on multiple pixels simultaneously using sliced arithmetic, while maintaining full accuracy. In certain embodiments, the number of operations are further reduced by compromising full accuracy. This approximation is applicable to decoding of bi-directional frames.

12 Claims, 3 Drawing Sheets

| P00 | P01 | P02 | P03 |  |  |  | P07 | P08 |
|---|---|---|---|---|---|---|---|---|
| P10 | P11 |  |  |  |  |  | P17 | P18 |
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |
| P70 | P71 |  |  |  |  |  | P77 | P78 |
| P80 | P81 |  |  |  |  |  | P87 | P88 |

| U00 | U01 | U02 | U03 |  |  |  | U07 |
|---|---|---|---|---|---|---|---|
| U10 | U11 |  |  |  |  |  | U17 |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
| U70 | U71 |  |  |  |  |  | U77 |

HORIZONTAL 1-d FILTER $U_{00} = P_{00} + P_{01}, U_{01} = P_{01} + P_{02}, U_{02} = P_{02} + P_{03}, \ldots$ $U_{10} = P_{10} + P_{11}, U_{11} = P_{11} + P_{12}, U_{12} = P_{12} + P_{13}, \ldots$ $\cdots$ $U_{70} = P_{70} + P_{71}, U_{71} = P_{71} + P_{72}, U_{72} = P_{72} + P_{73}, \ldots$

HIGHLY EFFICIENT METHOD AND STRUCTURE FOR MOTION COMPENSATION IN A VIDEO DECOMPRESSION SYSTEM

This is a continuation of application Ser. No. 08/526,533 filed Sep. 11, 1995 now abandoned.

INTRODUCTION

1. Technical Field

This invention pertains to the storage and transmission of video information in a digital format, and more specifically to novel methods and structures for decompressing digital video in a highly efficient manner.

2. Background

The CCITT/ISO committee has standardized a set of compression algorithms for full motion digital video. These compression standards are popularly known as MPEG-1 (ISO/IEC 11170-2), and MPEG-2 (ISO/IEC 13818-2). Applications of these standards include CD-ROM based interactive video for edutainment, and digital video transmission for home entertainment. Both these standards as well emerging HDTV standards are based on motion compensated predictive coding techniques. A simplified video decoding process based on such a scheme is shown in FIG. 1.

The processing steps shown in FIG. 1 are for decoding full motion video according to the MPEG standard. Processor 1 converts hierarchically encoded fixed length and variable length encoded data into a sequence of fixed length control data and coefficient data. Fixed length control data such as quantization scale is sent to Inverse Quantizer 2, block type is sent to Block Adder processor 4, and motion vectors are sent to Frame Buffer 6. Inverse quantization is applied to coefficient data by inverse quantizer 2. Inverse quantized coefficient data is passed through Inverse DCT Processor 3 to produce in an 8×8 block of pixel data. Motion Vectors are sent to Frame Buffer 6, which contains three frames, namely Forward Frame, Backward Frame, and a Bi-directional Frame. A block of data is fetched from one or both of Forward Frame and Backward Frame, addressed by the motion vectors. Fetched blocks are passed through Half Pixel Filter 5 for two-dimensional filtering. These filtered blocks are combined with the pixel block from Inverse DCT processor 3 according to the block type to make the reconstructed block. This reconstructed block is sent to Frame Buffer 6 along with the destination vector to be written into the destination frame.

Software implementations of decoders on a general purpose computer is attractive because of its low cost. However, prior art software decoder implementations of these standards (MPEG-1), such as one available from UC Berkeley, for use on general purpose computers tend to be slow in terms of number of decoded frames per second. One of the time-consuming tasks in decompressing video is the arithmetic required for Half Pixel Filtering and Motion Compensation.

FIG. 2 is a diagram depicting video frame 21 including a plurality of pixel blocks, such as pixel block 22. Pixel blocks are a subset of pixels contained within the video frame, and the size of a pixel block is determined for easy manipulation, and typically contains an 8×8 or 9×9 block of pixel data.

FIG. 3 is a diagram depicting a typical 9×9 pixel block, including a plurality of pixels P00 through P88.

FIG. 4 is a diagram depicting an 8×8 filter pixel block 41 which is derived from the 9×9 pixel block of FIG. 3, utilized in the following manipulations:

Horizontal One Dimensional Filter $U_{00}=(P_{00}+P_{01}+1)>>1$, $U_{01}=(P_{01}+P_{02}+1)>>1$, $U_{02}=(P_{02}+P_{03}+1)>>1$, $U_{10}=(P_{10}+P_{11}+1)>>1$, $U_{11}=(P_{11}+P_{12}+1)>>1$, $U_{12}=(P_{12}+P_{13}+1)>>1$, $U_{70}=(P_{70}+P_{71}+1)>>1$, $U_{71}=(P_{71}+P_{72}+1)>>1$, $U_{72}=(P_{72}+P_{73}+1)>>1$, Vertical One Dimensional Filter $U_{00}=(P_{00}+P_{10}+1)>>1$, $U_{01}=(P_{01}+P_{11}+1)>>1$, $U_{02}=(P_{02}+P_{12}+1)>>1$, $U_{10}=(P_{10}+P_{20}+1)>>1$, $U_{11}=(P_{11}+P_{21}+1)>>1$, $U_{12}=(P_{12}+P_{22}+1)>>1$, $U_{70}=(P_{70}+P_{80}+1)>>1$, $U_{71}=(P_{71}+P_{81}+1)>>1$, $U_{72}=(P_{72}+P_{82}+1)>>1$, Two Dimensional Filter $U_{00}=(P_{00}+P_{01}+P_{10}+P_{11}+2)>>9$, $U_{01}=(P_{01}+P_{02}+P_{11}+P_{12}+2)>>9$, $U_{02}=(P_{02}+P_{03}+P_{12}+P_{13}+2)>>9$, $U_{10}=(P_{10}+P_{11}+P_{20}+P_{21}+2)>>9$, $U_{11}=(P_{11}+P_{12}+P_{21}+P_{22}+2)>>9$ $U_{70}=(U_{77}+U_{78}+U_{87}+U_{88}+2)>>4$ The present invention is concerned with Half Pixel Filter 5, and Motion Compensation Processor 4, which permits efficient implementation of Half Pixel Filter and Block Reconstruction Arithmetic on a general purpose CPU. In accordance with the teachings of this invention, novel methods and structures are taught for implementing Half Pixel Filtering and Block Averaging procedures, that require significantly fewer numbers of operations, thereby greatly enhancing speed.

SUMMARY

In accordance with the teachings of this invention, novel method and structure are taught for the implementation of Half Pixel Filtering and Block Averaging that are efficient for implementation on a general purpose CPU. In accordance with this invention, the number of required operations are reduced by operating on multiple pixels simultaneously using sliced arithmetic, while maintaining full accuracy. In certain embodiments of this invention, the number of operations are further reduced by compromising full accuracy. This approximation is applicable to decoding of bi-directional frames.

BRIEF DESCRIPTION OF THE DRAWINGS

FIG. 3 is a more detailed view of a typical pixel block;

FIG. 4 is a diagram depicting a filter pixel block derived from the pixel block of FIG. 3.

DETAILED DESCRIPTION

Figure 1:
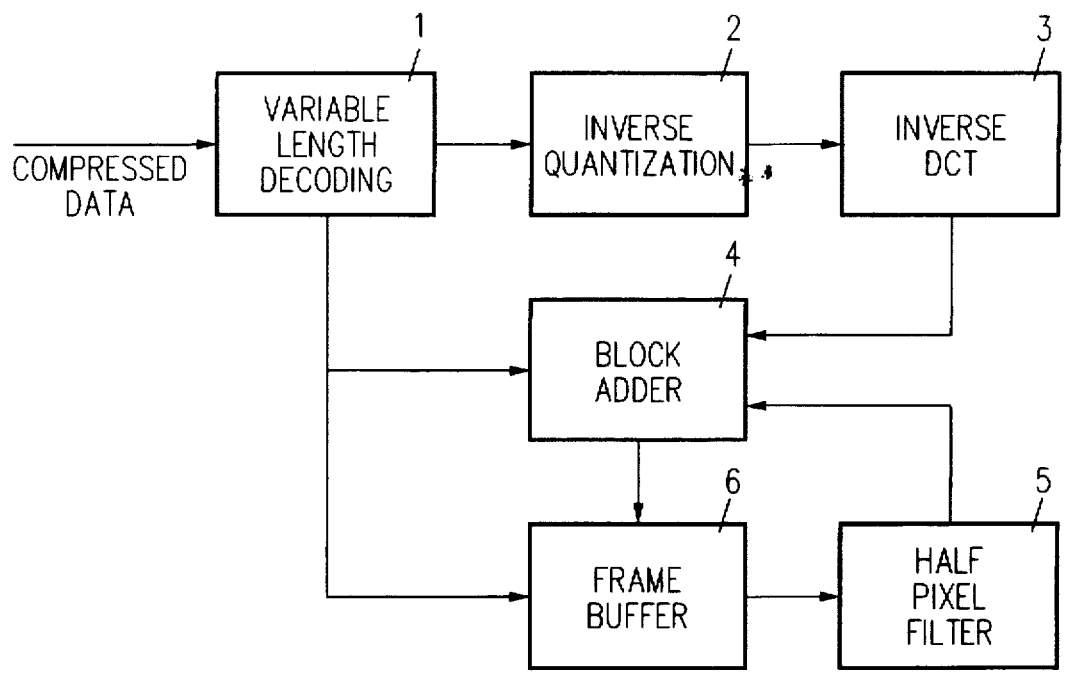
FIG. 1 is a block diagram depicting a typical prior art video decoding structure.
Figure 2:
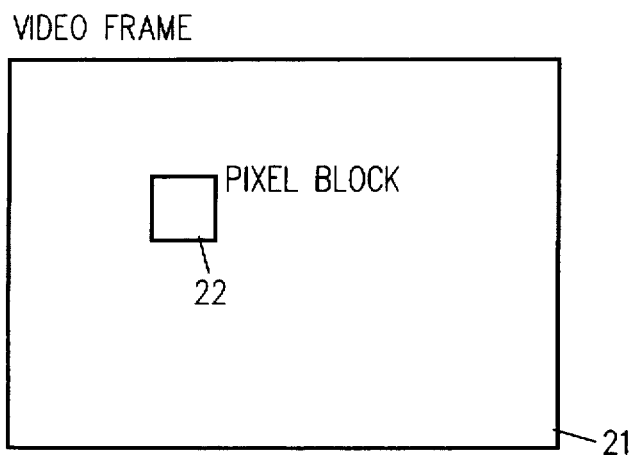
FIG. 2 is a diagram depicting a typical video frame containing a plurality of pixel blocks.

In accordance with the teachings of this invention, a novel method and structure are taught for implementation of half pixel filtering and block averaging utilizing sliced arithmetic. Thus, in accordance with the teachings of this invention, two eight bit sets of pixels are treated as a single 16 bit word, for example, when the CPU bus is a 16 bit bus. Obviously, for 32 bit buses, four eight bit sets of pixels can be manipulated simultaneously, for a 64 bit CPU bus eight sets of eight pixels can be manipulated simultaneously, etc. The following example shows how two sets of eight pixel bits are processed simultaneously.

i) A prior art software implementation of a one Dimensional Half Pixel Filter in horizontal direction:

```
for (i = 0; i < 8; i++) {
    for (j = 0; j < 8; j++) {
        a = in_block[i][j]
        b = in_block[i][j+1];
        o = (a + b + 1) >> 1;
        out_block[i][j] = o;
    }
}
```

In accordance with this prior art software implementation, the total number of operations for an 8×8 block of pixels is 384.

A typical prior art software implementation for a two dimensional half pixel filter operating on an 8×8 block of pixels is as follows.

A typical prior art software only implementation for a block average for a bi-directional block of 8×8 pixels is as follows.

iii) Block Average for Bi-directional Block

```
for (i = 0; i < 8; i++) {
    for (j = 0; j < 8; j++) {
        a = f_in_block[i][j]
        b = b_in_block[i][j+1];
        o = (a + b + 1) >> 1;
        out_block[i][j] = o;
    }
}
```

As can be seen from the above, for a typical prior art software only block average for bi-directional block of 8×8 pixels requires a total of 384 operations per block.

The following embodiment shows two pixels processed simultaneously on a 16 bit data path, in accordance with this invention. As will be described later, the teachings of this invention are equally applicable to other sizes of pixel blocks, and other sizes of data paths, allowing a bit sliced operation for enhanced performance. The operation performed is:

$$J=(Z+Y+1)>>1$$

$$K=(Y+X+1)>>1$$

| Step | 8 MSBs | | | | | | | | 8 LSBs | | | | | | | | Operation |
|---|---|---|---|---|---|---|---|---|---|---|---|---|---|---|---|---|---|
| 1 | Z7 | Z6 | Z5 | Z4 | Z3 | Z2 | Z1 | Z0 | Y7 | Y6 | Y5 | Y4 | Y3 | Y2 | Y1 | Y0 | ZY |
| 2 | Y7 | Y6 | Y5 | Y4 | Y3 | Y2 | Y1 | Y0 | X7 | X6 | X5 | X4 | X3 | X2 | X1 | X0 | YX |
| 3 | Z7 | Z6 | Z5 | Z4 | Z3 | Z2 | Z1 | 00 | Y7 | Y6 | Y5 | Y4 | Y3 | Y2 | Y1 | 00 | ZY & OXFEFE |
| 4 | 00 | Z7 | Z6 | Z5 | Z4 | Z3 | Z2 | Z1 | 00 | Y7 | Y6 | Y5 | Y4 | Y3 | Y2 | Y1 | ZY_MSB=(ZY & OXFEFE) >>1 |
| 5 | 00 | 00 | 00 | 00 | 00 | 00 | 00 | Z0 | 00 | 00 | 00 | 00 | 00 | 00 | 00 | Y0 | ZY_LSB = (ZY & 0X0101) |
| 6 | Y7 | Y6 | Y5 | Y4 | Y3 | Y2 | Y1 | 00 | X7 | X6 | X5 | X4 | X3 | X2 | X1 | 00 | YX & OXFEFE |
| 7 | 00 | Y7 | Y6 | Y5 | Y4 | Y3 | Y2 | Y1 | 00 | X7 | X6 | X5 | X4 | X3 | X2 | X1 | YX_MSB=(YX & OXFEFE) >>1 |
| 8 | 00 | 00 | 00 | 00 | 00 | 00 | 00 | Y0 | 00 | 00 | 00 | 00 | 00 | 00 | 00 | 00 | YX_LSB=(YX & 0X0101) |
| 9 | 00 | Z7 | Z6 | Z5 | Z4 | Z3 | Z2 | Z1 | 00 | Y7 | Y6 | Y5 | Y4 | Y3 | Y2 | Y1 | |
| | | | | | | | | + | | | | | | | | | |
| 10 | 00 | Y7 | Y6 | Y5 | Y4 | Y3 | Y2 | Y1 | 00 | X7 | X6 | X5 | X4 | X3 | X2 | X1 | |
| | | | | | | | | = | | | | | | | | | |
| 11 | U7 | U6 | U5 | U4 | U3 | U2 | U1 | U0 | V7 | V6 | V5 | V4 | V3 | V2 | V1 | V0 | UV_MSB=(ZY_MSB+YX_MSB) |
| 12 | 00 | 00 | 00 | 00 | 00 | 00 | 00 | Z0 | 00 | 00 | 00 | 00 | 00 | 00 | 00 | Y0 | |
| | | | | | | | | OR | | | | | | | | | |
| 13 | 00 | 00 | 00 | 00 | 00 | 00 | 00 | Y0 | 00 | 00 | 00 | 00 | 00 | 00 | 00 | X0 | |
| | | | | | | | | = | | | | | | | | | |
| 14 | 00 | 00 | 00 | 00 | 00 | 00 | 00 | E0 | 00 | 00 | 00 | 00 | 00 | 00 | 00 | F0 | EF_LSB = (ZY_LSB\|YX_LSB) |
| 15 | U7 | U6 | U5 | U4 | U3 | U2 | U1 | U0 | V7 | V6 | V5 | V4 | V3 | V2 | V1 | V0 | |
| | | | | | | | | + | | | | | | | | | |
| 16 | 00 | 00 | 00 | 00 | 00 | 00 | 00 | E0 | 00 | 00 | 00 | 00 | 00 | 00 | 00 | F0 | |
| | | | | | | | | = | | | | | | | | | |
| 17 | J7 | J6 | J5 | J4 | J3 | J2 | J1 | J0 | K7 | K6 | K5 | K4 | K3 | K2 | K1 | K0 | | ii) Two Dimensional Half Pixel Filter:

```
for (i = 0; i < 8; i++) {
    for (j = 0; j < 8; j++) {
        a = in_block[i][j]
        b = in_block[i][j+1];
        c = in_block[i+1][j];
        d = in_block[i+1][j+1];
        o = (a + b + c + d + 2) >> 2;
        out_block[i][j] = o;
    }
}
```

In accordance with this prior art software implementation of a two dimensional half pixel filter on an 8×8 block of pixels, the total number of operations per block is 640.

As shown in step 1, a 16 bit word is filled such that its eight most significant bits are the eight pixel bits Z0 through Z7 of pixel Z, and its eight least significant bits are filled with the eight pixels Y0 through Y7 of pixel Y. In step 2, another 16 bit word is filled such that its eight most significant bits are filled with the Y0 through Y7 pixels of pixel Y, and its eight least significant bits are filled with the eight pixel bits X0–X7 of pixel X. In step 3, 16 bit word ZY is ANDed with digital word OXFEFE such that the least significant bits of the Z and Y pixel blocks are set to 0. In step 4, the ZY word from step 3 is shifted one position to the right, with the most significant bit being filled with 00, thereby forming a ZY_MSB word containing the most significant bits of the Z and Y pixel blocks.

As shown in Step 5, a new word ZY_LSB is created such that the least significant pixels Y0 and Z0 are maintained for later use in order to ensure full accuracy of the final result.

In step 6, 7 and 8, the same operations are performed on the YX word of step 2 as was performed in steps 3, 4 and 5 for the ZY word of step 1. This results in a YX_MSB word (7) and a YX_LSB word (step 8). In step 11, the ZY_MSB word is added with the YX_MSB word to provide a UV_MSB word as shown in step 11. In step 14, the ZY_LSB word is logically ORed with the YX_LSB word to provide an EF_SB word as shown in step 14.

Then, as shown in steps 15 through 17, the UV_MSB word from step 11 and the EF_LSB word from step 14 are ANDed together to provide pixels J and K.

As shown in step 17, in accordance with the teachings of this invention a plurality of pixel blocks are operated on simultaneously in bit sliced fashion while retaining full accuracy because the operations include manipulation and inclusion of the LSBs.

Having now demonstrated the above exemplary embodiment for processing simultaneously two 8 bit pixels in a 16 bit data path, the following equation describes one embodiment of this invention for the basic procedure required for one-dimensional half pixel filter and bi-directional block averaging operation of a single 8 bit pixel on an 8 bit data path.

$$\frac{A+B+1}{2} = (A > 1) + (B > 1) +$$

$$\{(A \& 1) + (B \& 1) + 1\} > 1\ MSB_7$$

$$(A > 1) + (B > 1) + (A \& 1)(B \& 1)\ MSB_7$$

Since this operation is performed on 8 bit data path without any carry propagation to the most significant bits, it is extensible to processing multiple pixels on a wider data path. For example, two 8 bit pixels processed simultaneously on a 16 bit data path; four 8 bit pixels processed simultaneously on a 32 bit data path; eight 8 bit pixels can be processed on a 64 bit data path, and the like.

Implementation of H=(A+B+1)>>1 on 8 bit Data Path

A is an 8 bit number of bits a7 (MSB) to a0 (LSB);

B is an 8 bit number of bits b7 (MSB) to b0 (LSB); and

H is an 8 bit number of bits h7 (MSB) to h0 (LSB).

H=(a7, . . . 0+b7, . . . 0+1)>>1

H=(a7, . . . 1+b7, . . . 1)+(a0+b0+1)>>1 a7, . . . 1=(A&0xfe)>>1 b7, . . . 1=(B&0xfe)>>1 a0=A&0x1 b0+B&0x1

(a0+b0+1)>>1=a0|b0

H=((A&0xfe)>>1)+((B&0xfe)>>1+((A&0x1)|(B&0x1))

The following equation describes one embodiment for the basic procedure required for a two-dimensional half pixel filter and bi-directional block averaging operation of a single 8 bit pixel on an 8 bit data path. Since this operation is performed on 8 bit data path without any carry propagation to the most significant bits, it is extensible to processing multiple pixels on a wider data path. For example, two 8 bit pixels processed simultaneously on a 16 bit data path; four 8 bit pixels can be processed simultaneously on a 32 bit data path; eight 8 bit pixels can be processed simultaneously on a 64 bit data path; and the like.

$H = (A + B + C + D + 2) >> 2$ $H = ((A >> 2) + (B >> 2) + (C >> 2) + (D >> 2)) + $ $((A\&0 \times 3) + (B\&0 \times 3) + (C\&0 \times 3) + (D\&0 \times 3) + 2) >> 2$ Implementation of H=(A+B+C+D+2)>>2, on 8 bit Data Path A is an 8 bit number of bits a7 (MSB) to a0 (LSB), a7 being MSB and a0 LSB B is an 8 bit number of bits b7 (MSB) to b0 (LSB);

A is an 8 bit number of bits c7 (MSB) to c0 (LSB);

D is an 8 bit number of bits d7 (MSB) to d0 (LSB); and

H is an 8 bit number of bits h7 (MSB) to h0 (LSB).

H=(a7, . . . 0+b7, . . . 0+c7, . . . 0+d7, . . . 0+2)>>2

H=(a7, . . . 2+b7, . . . 2+c7, . . . 2+d7, . . . 2

)+(a1·0+b1, 0+d1, 0+2)>>2 a7, . . . 2=(A&0xfc)>>2 b7, . . . 2=(B&0xfc)>>2 c7, . . . 2=(C&0xfc)>>2 d7, . . . 2=(D&0xfc)>>2 a1,0=A&0x3 b1,0=B&0x3 c1,0=C&0x3 d1,0=D&0x3

H=((A&0xfc)>>2)+((B&0xfc)>>2)+((C&0xfc)>>2)+((D&0fc)>>2+((A&0x3)+(B&0x3)+(C&0x3)+(D&0x3)+2)>>2

Given the above general description of the present invention, the following is an exemplary embodiment of this invention for use with a 64 bit processor for performing a one dimensional half pixel filter in the horizontal direction on two adjacent eight bit pixel blocks is as follows.

i) One Dimensional Half Pixel Filter in horizontal direction:

```
for (i = 0; i < 8; i++) {
    A = (int64*) (in_block[i][0]);
    B = (int64*) (in_block[i][0]);
    A_MSB = (A & 0xfefefefefefefefe) >> 1;
    B_MSB = (B & 0xfefefefefefefefe) >> 1;
    A_LSB = A & 0x0101010101010101;
    B_LSB = B & 0x0101010101010101;
    MSB = A_MSB + B_MSB;
    LSB = A_LSB | B_LSB );
    O = MSB + LSB;
    (int64*) (out_block[i][j]) = O;
}
```

As shown, in accordance with the teachings of this invention, a software only implementation of a one dimensional half pixel filter in the horizontal direction requires only 96 operations per 8×8 pixel block, as compared with the 384 operations previously described with respect to the prior art.

Also, in accordance with the teachings of this invention, a software procedure that performs a two dimensional half pixel filter is as follows.

ii) Two Dimensional Half Pixel Filter:

```
for (i = 0; i < 8; i++) {
    A = (int64*) (in_block[i][0]);
    B = (int64*) (in_block[i][0]);
    C = (int64*) (in_block[i][0]);
    D = (int64*) (in_block[i][0]);
```

```
A_MSB = (A & 0xfcfcfcfcfcfcfcfc) >> 2;
B_MSB = (B & 0xfcfcfcfcfcfcfcfc) >> 2;
C_MSB = (C & 0xfcfcfcfcfcfcfcfc) >> 2;
D_MSB = (D & 0xfcfcfcfcfcfcfcfc) >> 2;
A_LSB = A & 0x0303030303030303;
B_LSB = B & 0x0303030303030303;
C_LSB = C & 0x0303030303030303;
D_LSB = D & 0x0303030303030303;
MSB = A_MSB + B_MSB C_MSB + D_MSB;
LSB = A_LSB + B_LSB C_LSB + D_LSB);
LSB = (LSB + 0x0303030303030303) >> 2;
O = MSB + LSB;
(int64*) (out_block[i][j]) = O;
}
```

As shown, the total number of operations per 8×8 pixel block is 208, as compared with the 640 described above with respect to the prior art.

Also, in accordance with this invention, a software procedure that performs a block average for a bi-directional block is as follows.

iii) Block Average for BiDirectional Block

```
for (i = 0; i < 8; i++) {
    A = (int64*) (f_in_block[i][0]);
    B = (int64*) (b_in_block[i][0]);
    A_MSB = (A & 0xfefefefefefefefe) >> 1;
    B_MSB = (B & 0xfefefefefefefefe) >> 1;
    A_LSB = A & 0x0101010101010101;
    B_LSB = B & 0x0101010101010101;
    MSB = A_MSB + B_MSB;
    LSB = (A_LSB | B_LSB);
    O = MSB + LSB;
    (int64*) (out_block[i][j]) = O;
}
```

As shown, the total number of operations to manipulate an 8×8 block of pixels is 96, as compared with the 384 operations required in the prior art.

In alternative embodiments of this invention, greater speed is achieved at the sake of a small amount of accuracy by ignoring the LSB words (ZY_LSB and YX_LSB). In these embodiments, an example of a one dimensional half pixel filter, which requires only 64 operations per 8×8 block of pixels is as follows.

i) One Dimensional Half Pixel Filter in horizontal direction:

```
for (i = 0; i < 8; i++) {
    A = (int64*) (in_block[i][0]);
    B = (int64*) (in_block[i][1]);
    A_MSB = (A & 0xfefefefefefefefe) >> 1;
    B_MSB = (B & 0xfefefefefefefefe) >> 1;
    O = A_MSB + B_MSB;
    (int64*) (out_block[i][j] = O;
}
```

In accordance with this embodiment in which the LSBs are ignored with a small amount of inaccuracy being tolerated for the sake of speed, a two dimensional half pixel filter is achieved which requires only 128 operations per 8×8 block of pixels, for example as follows.

ii) Two Dimensional Half Pixel Filter:

```
for (i = 0; i < 8; i++) {
    A = (int64*) (in_block[i][0]);
    B = (int64*) (in_block[i][1]);
```

```
    C = (int64*) (in_block[i+1][0]);
    D = (int64*) (in_block[i+1][1]);
    A_MSB = (A & 0xfcfcfcfcfcfcfcfc) >> 2;
    B_MSB = (B & 0xfcfcfcfcfcfcfcfc) >> 2;
    C_MSB = (C & 0xfcfcfcfcfcfcfcfc) >> 2;
    D_MSB = (D & 0xfcfcfcfcfcfcfcfc) >> 2;
    O = A_MSB + B_MSB + C_MSB + D_MSB;
    (int64*) (out_block[i][j]) = O;
}
```

Furthermore, in accordance with this embodiment in which the LSBs are ignored, a block average for bi-directional block is achieved utilizing only 64 operations per block of 8×8 pixels as follows.

iii) Block Average for BiDirectional Block

```
for (i = 0; i < 8; i++) {
    A = (int64*) (f_in_block[i][0]);
    B = (int64*) (f_in_block[i][0]);
    A_MSB = (A & 0xfefefefefefefefe) >> 1;
    B_MSB = (B & 0xfefefefefefefefe) >> 1;
    O = A_MSB + B_MSB;
    (int64*) (out_block[i][j] = O;
}
```

Figure 5:
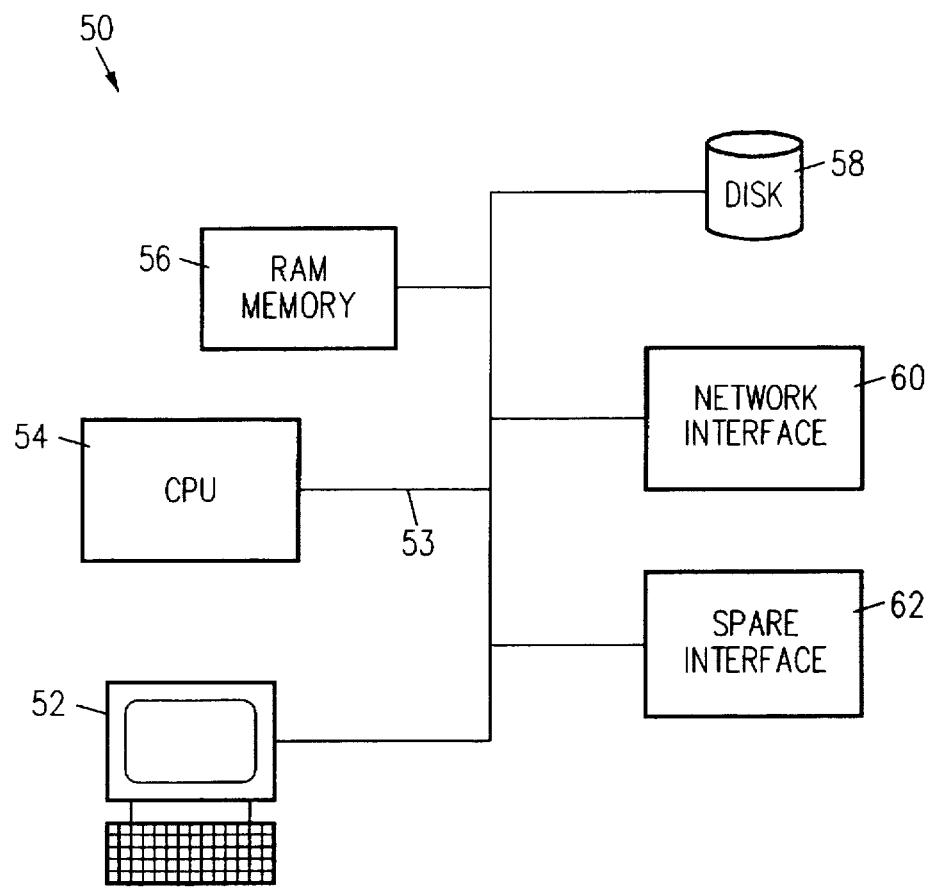
FIG. 5 depicts a computer that stores and executes the procedures for performing one embodiment of the invention.

FIG. 5 depicts a computer 50 that stores and executes the procedures for performing one embodiment of the invention. A user can interact with computer 50 via user interface 52 that is connected through data bus 53. Data bus 53 is an n bit data bus, for example a 16 bit data bus. The user can control the procedure operations and interact with the computer to design and implement various embodiments of the invention. A CPU 54 is provided to execute the various procedures involved in the invention, as described above. A RAM memory 56 is provided to store procedures and various other information that is needed for the CPU 54 and other elements of computer 50. A disk memory 58 is provided to store large amounts of information and to serve as an archive to store various procedures and operations that are needed by the processor from time to time. A network interface 60 permits computer 50 to communicate with other computers and to receive and transmit various information that may include other procedures for performing the invention. A spare interface 62 is provided to accommodate various storage devices, test equipment, video equipment, or other elements that may be needed from time to time.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed:

1. A method of decompressing video information including performing one-dimensional half pixel filtering in horizontal direction and block averaging for bidirectional block using a computer with a memory storing procedures and a processor having an n×m bit data bus executing the procedures, said method comprising the steps of:

receiving said video information in said processor via said data bus, wherein said video information includes a first plurality of n bit words, each representing a pixel, that forms a first n×m bit word, and a second plurality of n bit words, each representing a pixel, that forms a second n×m bit word;

setting the least significant bits of each of said first plurality of n bit words forming said first n×m bit word to zero;

shifting said first n×m bit word one position to the right, while filling the most significant bit of said first n×m bit word with a zero thereby forming a first MSB word;

setting the least significant bits of each of said second plurality of n bit words forming said second n×m bit word to zero;

shifting said second n×m bit word one position to the right, while filling the most significant bit of said second n×m bit word with a zero, thereby forming a second MSB word; and logically combining said first MSB word and said second MSB word to create a resultant MSB word, wherein said resultant MSB word represents one-dimensional half pixel filtered in horizontal direction and block averaged for bidirectional block video data.

2. A method as in claim 1 which further comprises the steps of:

creating a first LSB word of n×m bits containing the least significant bits of each of said first plurality of n bit words forming said first n×m bit word;

creating a second LSB word of n×m bits containing the least significant bits of each of said second plurality of n bit words forming said second n×m bit word;

logically combining said first LSB word and said second LSB word to create a resultant LSB word; and logically combining said resultant MSB word and said resultant LSB word.

3. A method as in claim 1 wherein said step of logically combining said first MSB word and said second MSB word comprises the step of ADDing said first MSB word and said second MSB word.

4. A method as in claim 2 wherein said step of logically combining said first LSB word and said second LSB word comprises the step of ORing said first LSB word and said second LSB word.

5. A method as in claim 2 wherein said step of logically combining said resultant MSB word and said resultant LSB word comprises the step of ADDing said resultant MSB word and said resultant LSB word.

6. A method as in claim 1 wherein the computer further includes a display, and said method further comprises the step of:

displaying said video information on the display.

7. A method of decompressing video information using a computer with a memory storing procedures and a processor having an n×m bit data bus executing the procedures, said method including performing two dimensional half pixel filtering, said method comprising the steps of:

receiving said video information in said processor via said data bus, wherein said video information is to be subjected to two dimensional half pixel filtering and includes a first plurality of n bit words, each representing a pixel, that forms a first n×m bit word, a second plurality of n bit words, each representing a pixel, that forms a second n×m bit word, a third plurality of n bit words, each representing a pixel, that forms a third n×m bit word, and a fourth plurality of n bit words, each representing a pixel, that forms a fourth n×m bit word;

setting the least significant bits of each of said first plurality of n bit words forming said first n×m bit word to zero;

shifting said first n×m bit word two positions to the right, while filling the two most significant bit of said first n×m bit word with a zero thereby forming a first MSB word;

setting the two least significant bits of each of said second plurality of n bit words forming said second n×m bit word to zero;

shifting said second n×m bit word two positions to the right, while filling the two most significant bit of said second n×m bit word with a zero, thereby forming a second MSB word;

setting the two least significant bits of each of said third plurality of n bit words forming said third n×m bit word to zero;

shifting said third n×m bit word two positions to the right, while filling the two most significant bit of said third n×m bit word with a zero, thereby forming a third MSB word;

setting the two least significant bits of each of said fourth plurality of n bit words forming said fourth n×m bit word to zero;

shifting said fourth n×m bit word two positions to the right, while filling the two most significant bit of said fourth n×m bit word with a zero, thereby forming a fourth MSB word; and logically combining said first MSB word, said second MSB word, said third MSB word, and said fourth MSB word to create a resultant MSB word, wherein said resultant MSB word represents two dimensional half pixel filtered video information.

8. A method as in claim 7 which further comprises the steps of:

creating a first LSB word of n×m bits containing two least significant bits of each of said first plurality of n bit words forming said first n×m bit word;

creating a second LSB word of n×m bits containing two least significant bits of each of said second plurality of n bit words forming said second n×m bit word;

creating a third LSB word of n×m bits containing two least significant bits of each of said third plurality of n bit words forming said third n×m bit word;

creating a fourth LSB word of n×m bits containing two least significant bits of each of said fourth plurality of n bit words forming said fourth n×m bit word;

logically combining said first LSB word, said second LSB word, said third LSB word, and said fourth LSB word to create a resultant LSB word; and logically combining said resultant MSB word and said resultant LSB word.

9. An apparatus for decompressing video information comprising:

a data bus, said data bus having a width of n×m bits;

a memory coupled to said data bus, said memory configured to store procedures, said procedures configured to perform one-dimensional half pixel filtering in horizontal direction and block averaging for bidirectional block on said video information;

a processor coupled to said memory via said data bus, said processor configured to execute said procedures to:

receive said video information in said processor via said data bus, wherein said video information includes a first plurality of n bit words, each representing a pixel, that forms a first n×m bit word, and a second plurality of n bit words, each representing a pixel, that forms a second n×m bit word;

set the least significant bits of each of said first plurality of n bit words forming said first n×m bit word to zero;

shift said first n×m bit word one position to the right, while filling the most significant bit of said first n×m bit word with a zero thereby forming a first MSB word;

set the least significant bits of each of said second plurality of n bit words forming said second n×m bit word to zero;

shift said second n×m bit word one position to the right, while filling the most significant bit of said second n×m bit word with a zero, thereby forming a second MSB word; and logically combine said first MSB word and said second MSB word to create a resultant MSB word, wherein said resultant MSB word represents one-dimensional half pixel filtered in horizontal direction and block averaged for bidirectional block video data.

10. The apparatus of claim 9 further comprising:

a user interface configured to permit a user to interact with the processor to create the procedures, initiate execution of the procedures, or halt the procedures.

11. A method in claim 8 wherein said step of logically combining said first LSB, said second LSB word, said third LSB word, and said fourth LSB word to create a resultant LSB word comprises the steps of:

adding said first LSB word, said second LSB word, said third LSB word, and said fourth LSB word to produce an intermediate result;

shifting said intermediate result by two position to the right; and

ANDing said shifted intermediate result with a mask to create said resultant LSB word.

12. A method in claim 8 wherein said step of logically combining said resultant MSB word and resultant LSB word comprises the step of ADDing said resultant MSB word and resultant LSB word.

\* \* \* \* \*